UNITED STATES PATENT OFFICE.

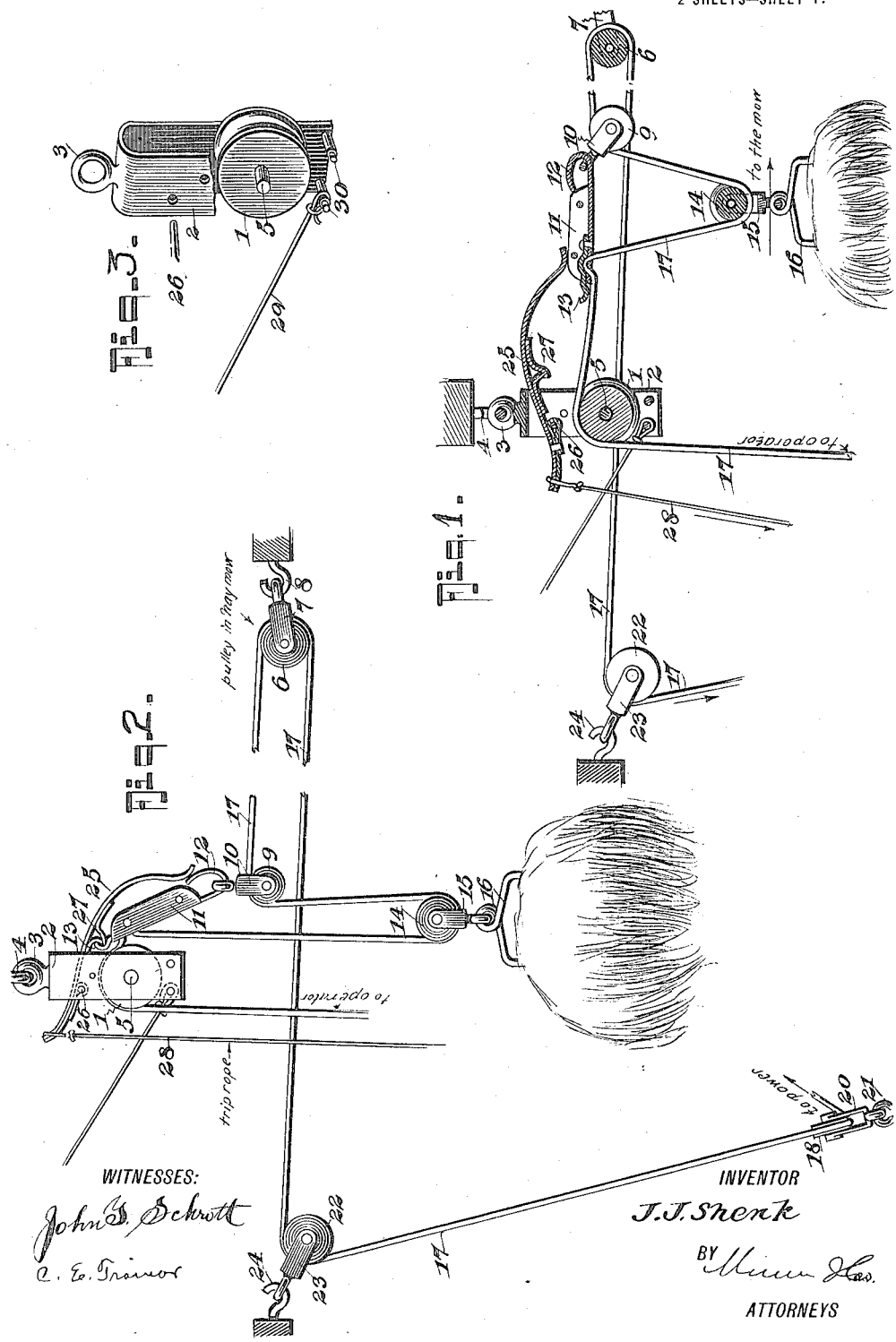

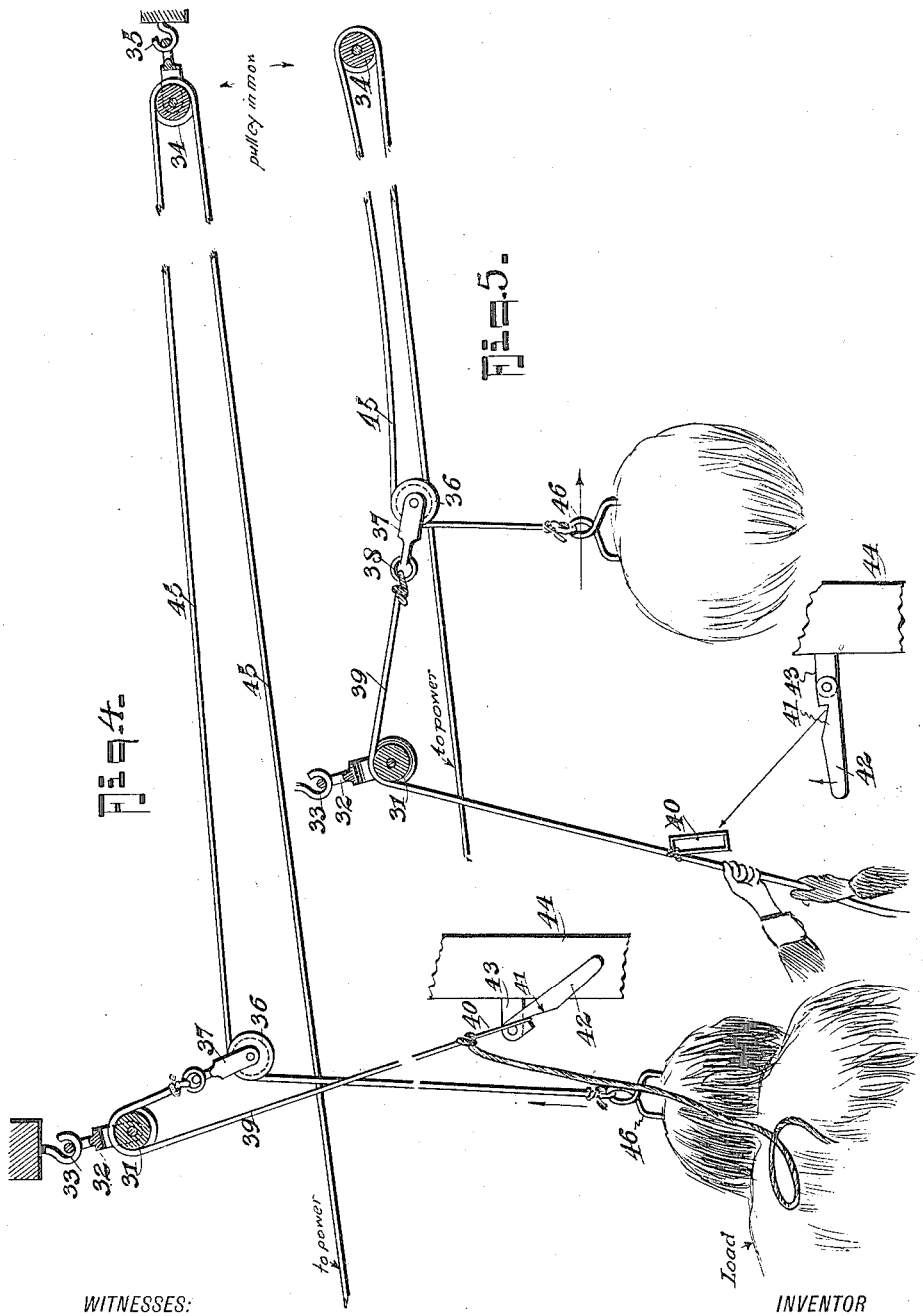

JOHN J. SHENK, OF FREDERICK, MARYLAND.

HAY-UNLOADER.

1,196,596.

Specification of Letters Patent.

Patented Aug. 29, 1916.

Application filed March 22, 1916. Serial No. 85,824.

*To all whom it may concern:*

Be it known that I, JOHN J. SHENK, a citizen of the United States, and a resident of Frederick, in the county of Frederick and State of Maryland, have invented a new and useful Improvement in Hay-Unloaders, of which the following is a specification.

My invention is an improvement in hay unloaders, and has for its object to provide an inexpensive and simple yet effective device of the character specified, wherein a fixed pulley is provided arranged directly above the wagon to be unloaded, and a movable pulley which may be arranged in any desired position to permit the hay to be deposited at any desired point in the barn, and wherein the pull or unloading rope or cable is so arranged that the hay fork with its load will be drawn directly upward toward the fixed pulley until the fork with its load is high enough to clear obstructions and will then be moved to the place where it is to be deposited and will be released or tripped by mechanism, under the control of the operator, on the wagon or by an automatic release.

In the drawings:—Figure 1 is a sectional view, showing the parts in one position, Fig. 2 is a side view showing the parts in another position, Fig. 3 is a perspective view of the fixed pulley, Figs. 4 and 5 are sectional views similar to Fig. 2, showing modifications, with the parts in different positions.

In the embodiment of the invention shown in Figs. 1 to 3, a fixed pulley 1 is provided, arranged between the arms of a U-shaped member or bracket 2, which is provided with an eye 3 at its body for permitting it to be connected with a hook 4 or the like, on one of the beams of a barn or other building in which the hay is to be stored. The pulley is journaled on a cross pin 5, and a second pulley 6 is arranged at the end of the barn or mow remote from the pulley 1, the said pulley 1 being arranged in such manner that the wagon load of hay may be drawn directly beneath the same.

The pulley 6 is journaled in a U-shaped bracket 7 having an eye which may be engaged with a hook 8 on one of the cross beams of the barn or mow. A third pulley 9 arranged within a U-shaped bracket 10 is connected with a carriage 11, the said carriage being channel-shaped and having at one end a hook 12, which engages the eye of the bracket 10. The carriage is provided at the opposite end with a latch member 13, in the form of a plate secured at one end to the carriage and extending beyond the same at the other end, the said end being bent into shallow hook form for a purpose to be presently described. A fourth pulley 14 journaled in the U-shaped bracket 15 is connected with the hay fork 16, by the usual eyes on the bracket and on the hay fork.

The rope or cable 17 passes from the draft animal or other source of power for lifting the hay beneath the pulley 18, journaled in the usual U-shaped bracket 20, secured to the floor of the barn or mow by means of a hook or eye 21. From thence the cable passes over a pulley 22, journaled in a U-shaped bracket 23, which is connected to a hook 24 at any part of the barn. The rope or cable then passes around the pulley 6 from below upward and thence over the pulley 9, beneath the pulley 14, to a connection with the carriage, and from the carriage the cable passes over the pulley 1 to the operator on the load of hay. The connection with the carriage is made by passing the rope or cable through openings in the bottom of the channel-shaped carriage, and the rope or cable is held in fixed relation with respect to the carriage by means of the latch plate before mentioned.

A trip lever 25 is pivoted between the arms of the U-shaped bracket 2 above the pulley 1, the said lever being pivoted on a pin 26. The trip lever has a catch 27 which is adapted to engage the shallow hook 13 of the latch plate to connect the carriage 11 to the pulley support of the pulley 1. A trip rope 28 is connected to the trip lever 25 on the opposite side of the pin 26 from the catch 27, and by making downward traction on the trip rope 28 the catch 27 may be released from the latch plate 13.

The pulley support 2 for the pulley 1 is braced against the pull of the load of hay when it is traveling into the mow by means of a brace rope or wire 29. This rope or wire is connected at one end to a fixed support within the barn or mow and at the other end to one of two pins 30, which connect the lower end of the arms of the bracket or pulley support 2.

It will be understood that in practice hooks 8 are arranged at different points in the barn or mow at any place where it may be desired to arrange the pulley 6, and this pulley is engaged with any of the hooks toward which it is desired to send the hay. That is, the pulley 6 is a movable element, and by arranging it at the different ends of the barn or mow or at the opposite sides, every portion of the barn or mow is made accessible without the necessity of hand labor for moving the hay.

In operation, the load of hay is driven beneath the pulley 21 and with the parts in the position of Fig. 3, the hay fork is driven into the load of hay in the usual manner. The draft animal is now started and the traction on the cable 17 causes that portion of the said cable passing over the pulley 9 to move upward, thus lifting the hay fork with its load. At the proper moment, in the upward movement of the fork the carriage is tripped and released from the trip lever, and a continued movement of the cable 17 causes the carriage with the fork and its load to move toward the pulley 6. When the hay is at the proper point, the fork may be released, or when an automatic release is provided the fork will release itself. By engaging the pulley 6 with different hooks 8, it will be obvious that the hay may be deposited in any part of the barn or mow.

By means of that portion of the rope 28 which connects with the lever 25 the operator may trip the carriage whenever desired, and without waiting for the carriage to trip automatically. After the hay has been released the operator returns the fork and the carriage toward the wagon by means of a portion of the cable 17, and he draws the fork downward by means of the trip rope. When the pulley 14 strikes the carriage the hook end 12 of the carriage is swung upward, moving the adjacent end of the lever 25 upward, and disengaging the latch mechanism. The rope 28 is an optional trip, permitting the carriage to be tripped whenever desired.

In the embodiment of the invention shown in Figs. 4 and 5, the pulley 31 corresponding to the pulley 1, is journaled in a U-shaped support 32, which is connected with a hook 33, arranged in the same manner as the hook 4. The other fixed pulley 34 is connected with a hook 35, arranged in the same manner as the hook 8, the pulley 34 corresponding to the pulley 6 of Fig. 1. A third pulley 36 is journaled in the U-shaped support 37, having a ring 38 to which is connected one end of a rope or cable 39, the said rope or cable passing over the pulley 31 to a position such that it may be grasped by the operator on the load of hay. This rope 39 has secured thereto near the end remote from the pulley 36 a rectangular link 40, the rope 39 being connected with one corner of the link as shown. This link is adapted to engage a notch 41 in a lever 42, which is pivoted to a lug 43, on a fixed support 44, which may be a beam or the like in the barn or mow. This notch 41 is so arranged with respect to the lever that when the lever is in the position of Fig. 4 and the link 40 is engaged with the notch the link will be prevented from upward movement bearing against the under edge of the lug 43 as well as against the end of the notch. When however, the free end of the lever is swung outward as shown in Fig. 5, the loop 40 will be released, and will be moved off the lug 43. The lifting rope or cable 45 has one end connected with a hay fork 46, and passes from thence over the pulley 36 and over the pulley 34 to a source of power, other pulleys corresponding to the pulleys 18 and 22 being provided for directing the rope or cable.

In operation the fork being engaged with the hay the parts are in the position of Fig. 4 and traction being made on that end of the cable 45 remote from the hay fork the fork with its load of hay will be lifted directly upward toward the pulley 31. This lifting movement continues until at the proper moment the operator releases the rope 39 by swinging the lever 42 outward as indicated in Fig. 5. The loop 40 is pushed off from the lug 43, and the movement of the rope 45 tends to move the fork with its load of hay toward the pulley 34, and the fork may be tripped in the usual manner at the desired point in its travel. During the movement of the fork and hay toward the pulley 34 the operator gradually pays out the rope 39 and the pulley 36 corresponds to the carriage of Fig. 1.

In either embodiment of the invention the weight, that is, the fork with its load of hay moves directly upward until the operator releases or trips the carriage 11 or the pulley 36, which corresponds to the carriage, after which the load moves horizontally. To return the fork the operator makes traction on the end of the rope 17 adjacent to him to draw the carriage 11 back to the position of Fig. 2. In Figs. 4 and 5 he makes traction on the rope 39 to draw the carriage or pulley 36 back to the pulley 31 and when in proper position the pulley 36 may be so held by the trip lever 42.

It will be obvious that in the construction of Figs. 1 to 3 that portion of the lifting cable between the operator and the carriage corresponds to the rope 39 and this said portion is made integral with the remainder of the cable merely as a matter of convenience and the said portion is rigid with the carriage at the latch plate 13.

It is obvious also that the portion of the cable between the latch plate and the pulley 14 might be eliminated, in which case that portion of the cable between the pulleys 9 and 14 should be connected directly with the hay fork. That portion of the cable 17 between the carriage and the operator is merely for returning the carriage. It is obvious that were the cable 17 connected directly with the hay fork it would appear in precisely the same manner as in the construction of Figs. 4 and 5. In either construction the operator can move the hay away from the wagon to the place of unloading at any height he desires, it being unnecessary to lift each load of hay to the top of the mow or barn before it commences its lateral movement.

I claim:—

1. A device of the character specified, comprising in combination with a hay fork a lifting cable and direction elements for guiding the same, of a pulley arranged in fixed position above the hay to be unloaded, a second pulley adapted to be arranged where desired in the mow, a carriage, a flexible member connected with the carriage and passing over the fixed pulley and under the control of the operator for returning the carriage, said carriage having a pulley and the lifting cable passing from the hay fork over the carriage pulley and over the second pulley, and thence over the direction elements to the source of power, and means for holding the carriage adjacent to the first named pulley, and controlled by the upward movement of the hay fork for releasing the carriage, and means in connection with the said last named means for permitting the operator to control the release of the carriage.

2. A device of the character specified, comprising in combination with a hay fork a lifting cable and direction elements for guiding the same, of a pulley arranged in fixed position above the hay to be unloaded, a second pulley adapted to be arranged where desired in the mow, a carriage, a flexible member connected with the carriage and passing over the fixed pulley and under the control of the operator for returning the carriage, said carriage having a pulley and the lifting cable passing from the hay fork over the carriage pulley and over the second pulley, and thence over the direction elements to the source of power, and means for holding the carriage adjacent to the first named pulley, said means being under the control of the operator for releasing the carriage when desired.

JOHN J. SHENK.

Witnesses:
MARSHALL L. GROVE,
RUSSELL C. GRIMES.

Copies of this patent may be obtained for five cents each, by addressing the "Commissioner of Patents, Washington, D. C."